US008692804B2

(12) United States Patent
Chung et al.

(10) Patent No.: US 8,692,804 B2
(45) Date of Patent: Apr. 8, 2014

(54) OPTICAL TOUCH SYSTEM AND METHOD

(75) Inventors: Yu-Chi Chung, Hsinchu County (TW); Hsin-Hung Lee, Kaohsiung County (TW); Hsu-Hung Chen, Taoyuan County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 207 days.

(21) Appl. No.: 12/949,971

(22) Filed: Nov. 19, 2010

(65) Prior Publication Data

US 2012/0050224 A1 Mar. 1, 2012

(30) Foreign Application Priority Data

Aug. 24, 2010 (TW) .............................. 99128322 A

(51) Int. Cl.
*G06F 3/042* (2006.01)
(52) U.S. Cl.
USPC ........................................ 345/175; 345/174
(58) Field of Classification Search
USPC ................................................ 345/174, 175
See application file for complete search history.

(56) References Cited

U.S. PATENT DOCUMENTS

| 4,710,760 | A * | 12/1987 | Kasday ........................ 345/175 |
| 4,894,540 | A * | 1/1990 | Komatsu ....................... 250/307 |
| 5,936,613 | A * | 8/1999 | Jaeger et al. .................. 345/172 |
| 6,232,957 | B1 * | 5/2001 | Hinckley ...................... 345/156 |
| 6,898,331 | B2 * | 5/2005 | Tiana ........................... 382/274 |
| 6,911,972 | B2 * | 6/2005 | Brinjes ......................... 345/175 |
| 7,119,924 | B2 * | 10/2006 | Prabhakar et al. ............. 358/1.9 |
| 7,420,155 | B2 * | 9/2008 | Mizota et al. ................. 250/221 |
| 7,538,759 | B2 | 5/2009 | Newton |
| 7,576,767 | B2 * | 8/2009 | Lee et al. ........................ 348/36 |
| RE41,447 | E * | 7/2010 | Tiana ............................ 382/274 |
| 8,218,909 | B2 * | 7/2012 | Khamene et al. ............. 382/300 |
| 8,248,662 | B2 * | 8/2012 | Seo ............................. 358/3.06 |
| 2003/0063097 | A1 * | 4/2003 | Prabhakar et al. ............ 345/589 |
| 2006/0103624 | A1 * | 5/2006 | Ishito et al. ................... 345/156 |
| 2009/0200453 | A1 | 8/2009 | Lieberman et al. |
| 2009/0219256 | A1 * | 9/2009 | Newton ......................... 345/173 |
| 2010/0117990 | A1 * | 5/2010 | Yahata .......................... 345/175 |
| 2010/0194711 | A1 * | 8/2010 | Tsai et al. ...................... 345/175 |
| 2010/0207872 | A1 * | 8/2010 | Chen et al. .................... 345/156 |
| 2010/0295821 | A1 * | 11/2010 | Chang et al. .................. 345/175 |
| 2010/0321342 | A1 * | 12/2010 | Lee .............................. 345/175 |

(Continued)

FOREIGN PATENT DOCUMENTS

TW 200510877 A 3/2005
TW 200512499 A 4/2005

(Continued)

*Primary Examiner* — Alexander S Beck
*Assistant Examiner* — Sejoon Ahn
(74) *Attorney, Agent, or Firm* — Rabin & Berdo, P.C.

(57) ABSTRACT

An optical touch system includes a substrate, a glass module, two light sources, three reflective clothes, two image sensors and a processing module. The glass module is disposed at one side of the substrate. The two light sources are respectively disposed at two terminals of the glass module. The three reflective clothes are disposed on the edges of the substrate contiguously. A touch region is formed among the three reflective clothes and the glass module for reflecting the light emitted from the two light sources. The two image sensors are disposed respectively next to the two light sources and used for capturing images in the touch region. The processing module is used for determining whether a touch action is performed according to the images in the touch region.

16 Claims, 7 Drawing Sheets

(56) References Cited

U.S. PATENT DOCUMENTS

| | | | |
|---|---|---|---|
| 2010/0328267 A1* | 12/2010 | Chen | 345/175 |
| 2011/0018822 A1* | 1/2011 | Lin et al. | 345/173 |
| 2011/0050644 A1* | 3/2011 | Su et al. | 345/175 |
| 2011/0052095 A1* | 3/2011 | Deever | 382/300 |
| 2011/0122076 A1* | 5/2011 | Herman | 345/173 |
| 2011/0199339 A1* | 8/2011 | Briden et al. | 345/175 |
| 2012/0038588 A1* | 2/2012 | Li et al. | 345/175 |
| 2012/0280941 A1* | 11/2012 | Hu | 345/175 |

FOREIGN PATENT DOCUMENTS

| | | |
|---|---|---|
| TW | 200943139 A | 10/2009 |
| TW | 201005606 A | 2/2010 |
| TW | 201030284 A | 8/2010 |

* cited by examiner

OPTICAL TOUCH SYSTEM AND METHOD

This application claims the benefit of Taiwan application Serial No. 99128322, filed Aug. 24, 2010, the subject matter of which is incorporated herein by reference.

BACKGROUND OF THE INVENTION

1. Field of the Invention

The invention relates in general to an optical touch system and method, and more particularly to a simple-structured and cost-down optical touch system and a method thereof.

2. Description of the Related Art

Due to the convenience and intuitiveness of operation, touch screen has been widely used in various electronic products. The touch module can be further divided in resistive type touch module, capacitive type touch module, ultra-sonic type touch module and optical type touch module according to the principles of sensing. The optical touch module, which mainly includes two video cameras, three reflective bars, and two infra-red LED, is mounted on a glass plate to form a product. The optical touch module detects the position of an object in the touch region according to the principle that when the user palaces an object such as a finger or a stylus in the touch region, the light emitted by the infra-red LED will be blocked by the object. Thus, according to the image captured by the cameras and the use of algorithm, the position of the object in the touch region will be obtained. However, the optical touch module which uses an entire piece of glass incurs more cost and requires higher assembly precision, hence making the manufacturing of the optical touch module more complicated.

SUMMARY OF THE INVENTION

The invention is directed to an optical touch system and a method thereof, which use a simple structure to reduce manufacturing cost and complexity, further use related algorithms to reduce the occurrence of erroneous action in the non-touch region.

According to a first aspect of the present invention, an optical touch system including a substrate, a glass module, two light sources, three reflective clothes, two image sensors and a processing module is provided. The glass module is disposed at one side of the substrate. The two light sources are respectively disposed at two terminals of the glass module. The three reflective clothes are disposed on the edges of the substrate contiguously. A touch region is formed among the three reflective clothes and the glass module for reflecting the light emitted from the two light sources. The two image sensors are disposed respectively next to the two light sources and used for capturing images in the touch region. The processing module is used for determining whether a touch action is performed according to the images in the touch region.

According to a second aspect of the present invention, an optical touch method used in an optical touch system is provided. The optical touch system includes a substrate, a glass module, two light sources, three reflective clothes, two image sensors and a processing module. The glass module is disposed at one side of the substrate. The two light sources are respectively disposed at two terminals of the glass module. The three reflective clothes are disposed on the edges of the substrate contiguously. A touch region is formed among the three reflective clothes and the glass module. The two image sensors are disposed respectively next to the two light sources. The optical touch method includes the following steps. The two image sensors capture a background image from the touch region. The processing module defines a left boundary and a right boundary on the background image to obtain an effective region. The two image sensors capture a current image from the touch region. The processing module, based on the non-zero pixels on the left boundary and the right boundary, defines a window-of-interest region image of the current image, and further compares the window-of-interest region image with a golden image to determine whether the glass module is strain offset.

The above and other aspects of the invention will become better understood with regard to the following detailed description of the preferred but non-limiting embodiment (s). The following description is made with reference to the accompanying drawings.

DETAILED DESCRIPTION OF THE INVENTION

The invention provides an optical touch system and a method thereof, which use a simple structure to reduce manufacturing cost and complexity and use related algorithms to reduce the occurrence of erroneous action in the non-touch region.

Figure 1:
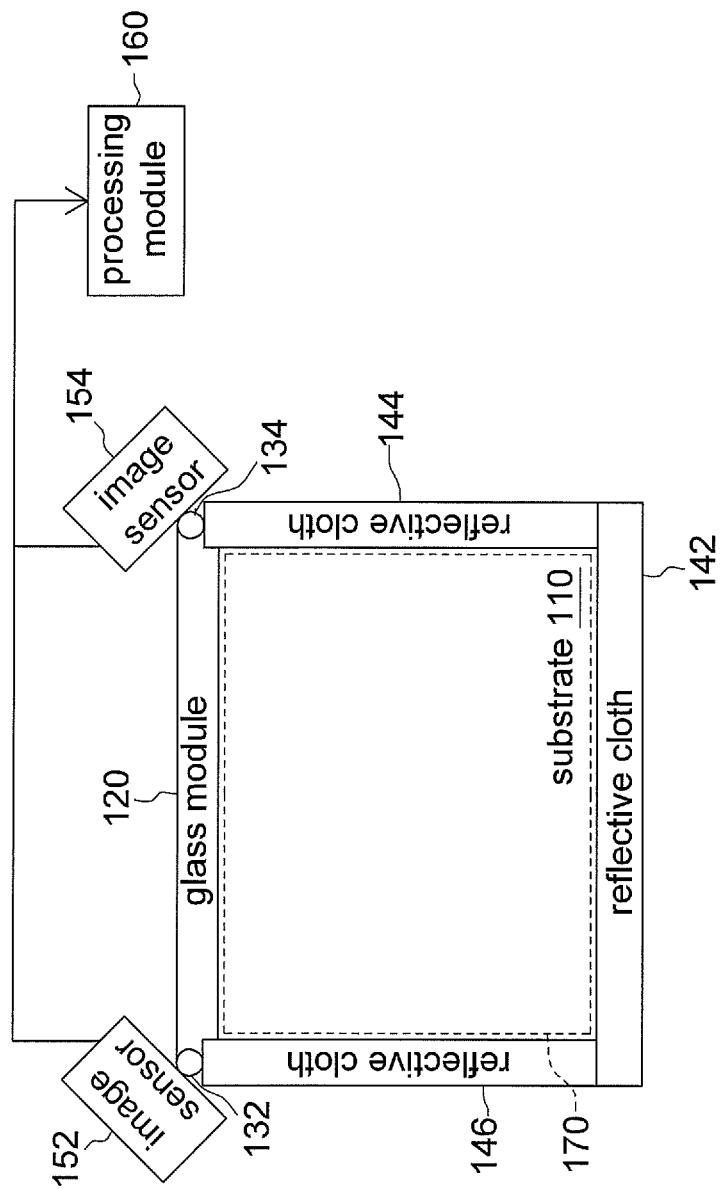
FIG. 1 shows an optical touch system according to a preferred embodiment of the invention.

Referring to FIG. 1, an optical touch system according to a preferred embodiment of the invention is shown. The optical touch system 100 includes a substrate 110, a glass module 120, two light sources 132 and 134, three reflective clothes 142, 144 and 146, two image sensors 152 and 154 and a processing module 160. The glass module 120 is disposed at one side of the substrate 110. In comparison to the conventional optical touch module which adopts a whole piece of glass, the glass module 120 of the invention is merely disposed in the non-active region at one side of the substrate 110. The two light sources 132 and 134 are respectively disposed at two terminals of the glass module 120 for emitting a light.

The three reflective clothes 142, 144 and 146 are disposed on the edges of the substrate contiguously 110. A touch region 170 is formed among the three reflective clothes 142, 144 and 146 and the glass module 120 for reflecting the light emitted from the two light sources 132 and 134. The invention replaces the conventional reflective bars with three reflective clothes 142, 144 and 146, not only largely increasing the amount of reflected light and the overall average gray value to resolve the problem of insufficient illumination at the corners, but also largely saving cost. Besides, the reflective clothes 142, 144 and 146 used in the invention have a larger width, hence increasing the tolerance for the strain offset caused by the glass module 120 when receiving a force. The two image sensors 152 and 154 are disposed respectively next to the two light sources 132 and 134 and used for capturing images in the touch region 170. The processing module 160 is used for determining whether a touch action is performed according to the images captured in the touch region 170.

Figure 2:
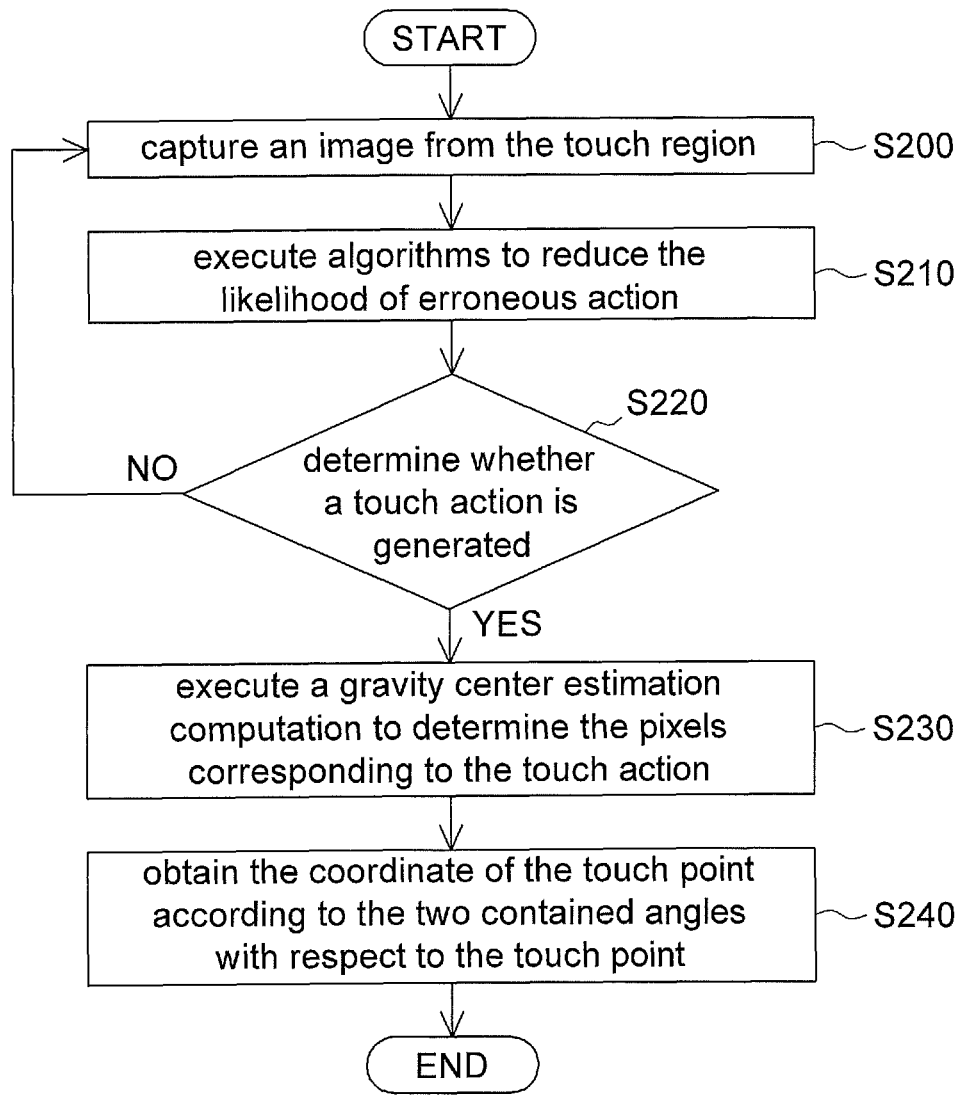
FIG. 2 shows a flowchart of an example of the operation of an optical touch system according to a preferred embodiment of the invention.
Figure 3:
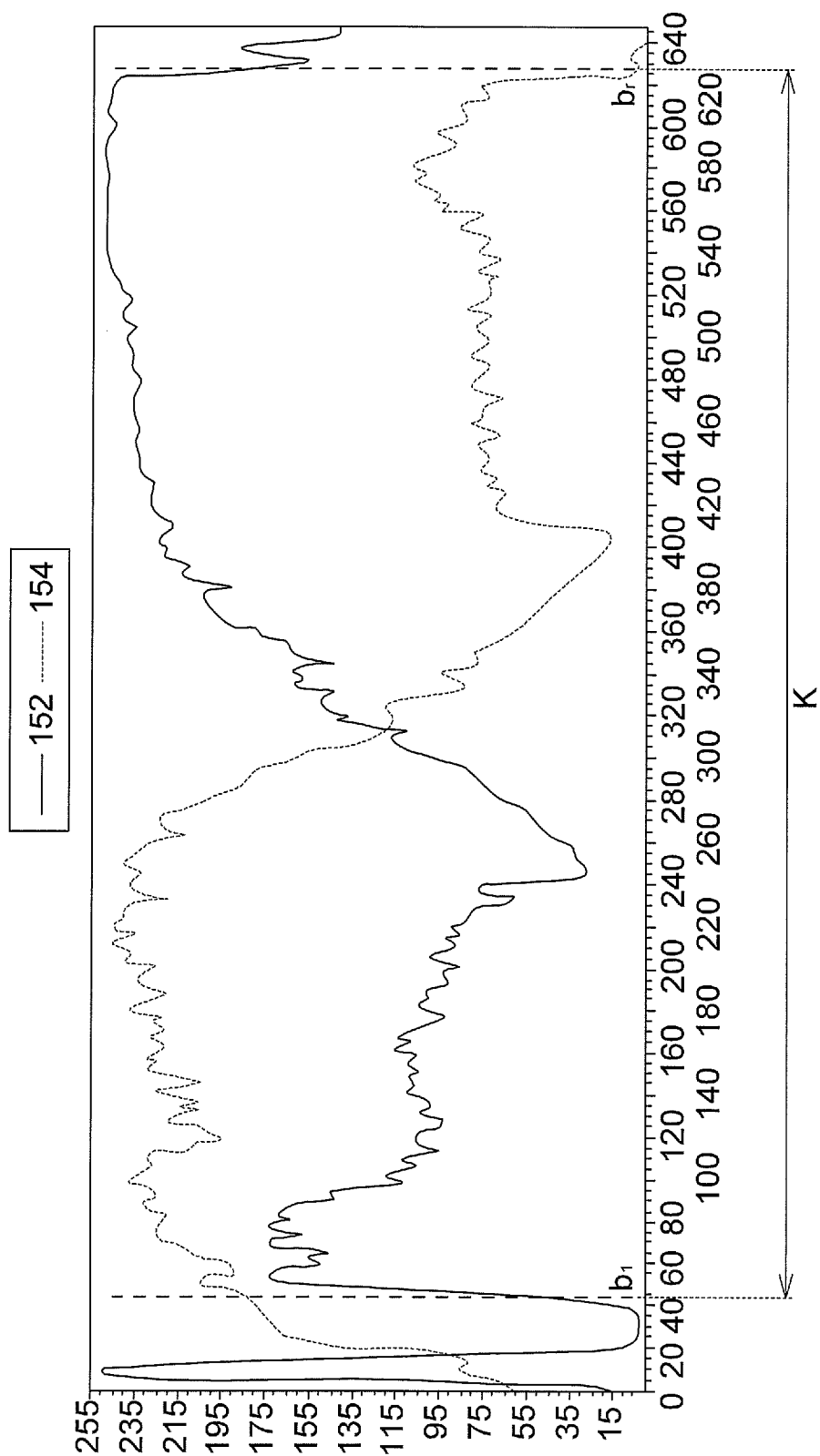
FIG. 3 shows a distribution of average gray values of a background image according to a preferred embodiment of the invention.

Referring to FIG. 2, a flowchart of an example of the operation of an optical touch system according to a preferred embodiment of the invention is shown. In step S200, two image sensors 152 and 154 respective capture an image from the touch region 170 and further combine the two captured images to obtain a background image. Referring to FIG. 3, a distribution of average gray values of a background image according to a preferred embodiment of the invention is shown. The processing module 160 performs initial processing to the background image to define a left boundary $b_l$ and a right boundary $b_r$ on the background image to obtain an effective region K as indicated in FIG. 3.

Next, the process proceeds to step S210, the processing module 160 divides similar data into a number of clusters according to the distribution of the data by clustering algorithms and further analyzes the clusters to reduce the likelihood of erroneous actions. The processing module 160 initially detects whether the glass module 120 is strain offset by a received force. Firstly, the two image sensors 152 and 154 capture a current image from the touch region 170. Then, the processing module 160 starts to locate more than n continuous non-zero pixel points in the left boundary $b_l$ and the right boundary $b_r$ of the current image until m zero pixel points appear. Thus, the processing module 160 defines a window of interest region image on the current image, wherein n and m are pre-determined positive integers.

Figure 4A:
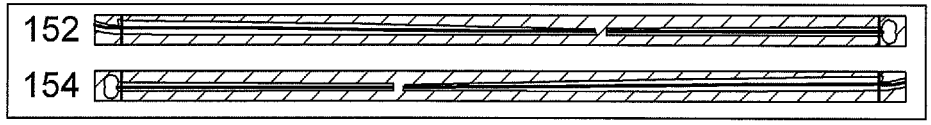
FIG. 4a shows a golden image at time point t according to a preferred embodiment of the invention.
Figure 4B:
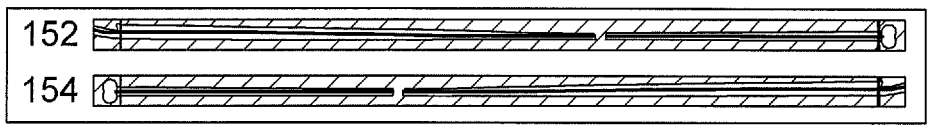
FIG. 4b shows a window-of-interest region image at time point (t+1) according to a preferred embodiment of the invention.

Then, the processing module 160 compares the window-of-interest region image with a golden image to determine whether the glass module 120 is strain offset. Referring to FIG. 4a and FIG. 4b. FIG. 4a shows a golden image at time point t according to a preferred embodiment of the invention. FIG. 4b shows a window-of-interest region image at time point (t+1) according to a preferred embodiment of the invention. That is, the processing module 160 uses the golden image at time point t (such as the image before delivery from the factory) as a reference image, and applies point-to-point region search to the window-of-interest region image at time point (t+1) by the algorithm of the block-based sum of absolute differences. Thus, the processing module 160 can evaluate whether the glass module 120 is strain offset after the delivery from the factory by comparing the similarity part between the window-of-interest region image and the golden image only. If it is determined that the glass module 120 is strain offset (that is, exceed the tolerance too much), then the optical touch system 100 will cease to be used.

Each captured image may contain random noises, which are divided into two types, namely, the Gaussian noises and the salt and pepper noises. If it is determined that the glass module 120 is not strain offset, then the processing module 160 can perform a low-pass filtering to the current image with a Gaussian smoothing filter to remove high-frequency noises and enhance the edges of the object. The Gaussian smoothing filter can be expressed as a two-dimensional Gaussian function in formula (1) so that each direction has the same level of smoothness.

$$G(x) = \left(-\frac{x}{\sigma^2} e^{-\left(\frac{x^2}{2\sigma^2}\right)}\right) \quad (1)$$

Wherein, x denotes pixel value.

Figure 5:
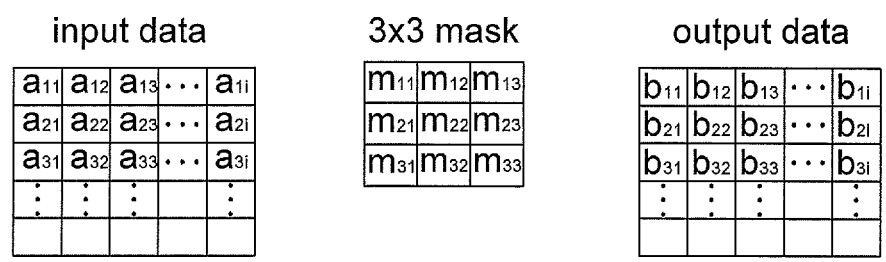
FIG. 5 shows the use of Gaussian smoothing filter according to a preferred embodiment of the invention.

In reality, the Gaussian smoothing filter can be realized by a 3×3 mask (mask 1). Referring to FIG. 5, the use of Gaussian smoothing filter according to a preferred embodiment of the invention is shown. As indicated in formula (2), the output pixel value b (i, j) is obtained from the convolution of the input image pixel value a (i, j) and the mask m (p, q).

$$b(i,j) = \frac{\begin{array}{l}m_{11}a_{(i-1)(j-1)} + m_{12}a_{(i-1)j} + m_{13}a_{(i-1)(j+1)} + m_{21}a_{i(j-1)} + \\ m_{22}a_{ij} + m_{23}a_{i(j+1)} + m_{31}a_{(i+1)(j-1)} + \\ m_{32}a_{(i+1)j} + m_{33}a_{(i+1)(j+1)}\end{array}}{m_{11} + m_{12} + m_{13} + m_{21} + m_{22} + m_{23} + m_{31} + m_{32} + m_{33}} \quad (2)$$

Figure 6A:
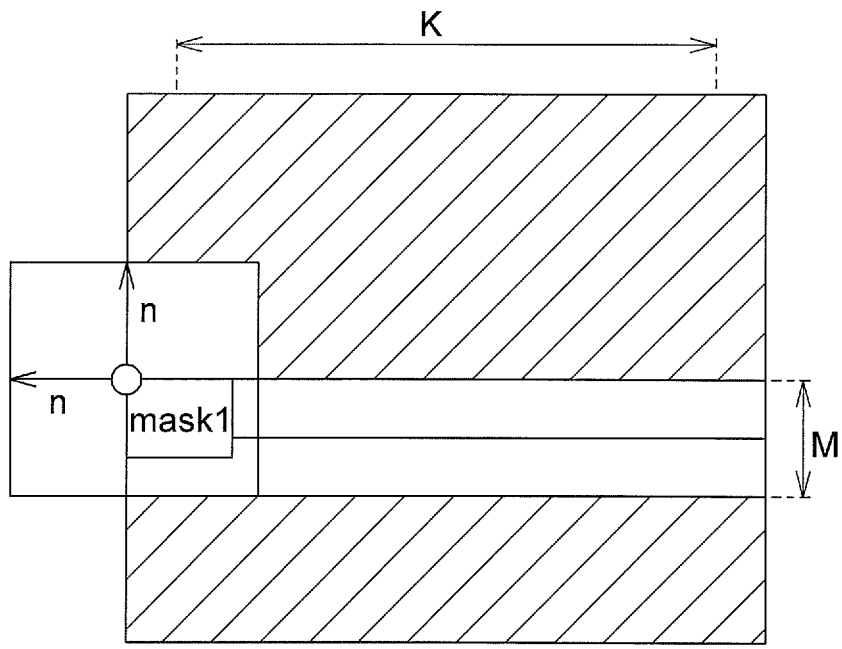
FIG. 6a and FIG. 6b respectively show a window-of-interest region image under different masks according to a preferred embodiment of the invention.
Figure 6B:
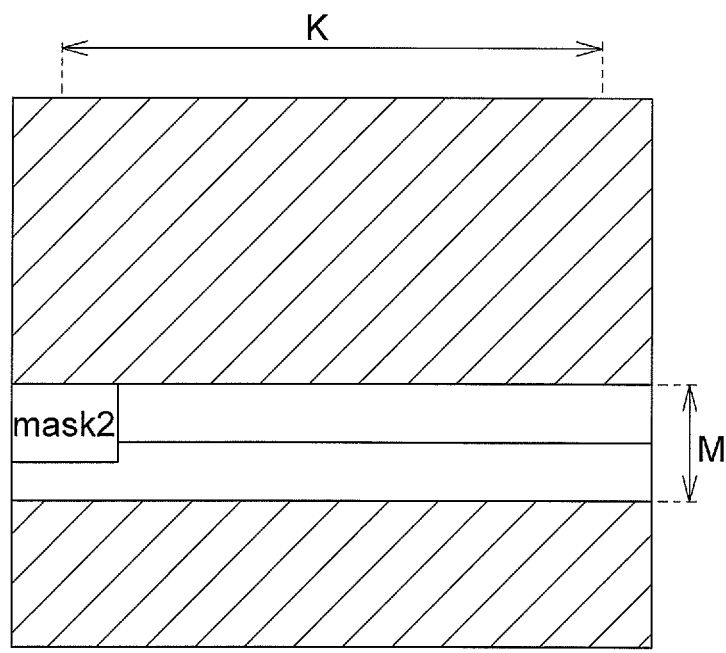
Figure 7:
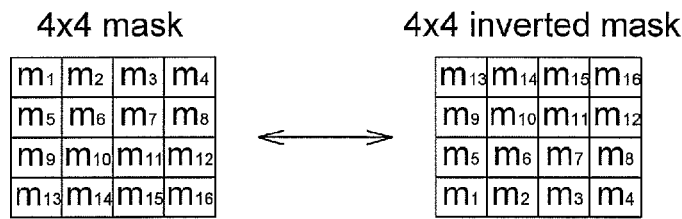
FIG. 7 shows a 4×4 mask and its corresponding 4×4 inverted mask.

Referring to FIG. 6a and FIG. 6b, a window-of-interest region image under different masks according to a preferred embodiment of the invention are respectively shown. In FIG. 6a and FIG. 6b, the window-of-interest region image is realized by a K×M image. Also, referring to FIG. 7, a 4×4 mask and its corresponding 4×4 inverted mask are shown, wherein the weights of the inverted mask are obtained through the inversion of the weights of the mask. The processing module 160 performs a block matching process with an inverted mask (mask 2) corresponding to the mask (mask 1) to each pixel of window-of-interest region image within a similarity search range which is centered at the pixel and extended to an n×n region, and records a relative position on which the sum of absolute differences is the minimum to position the edge boundaries of a physical surface and a reflective surface of the window-of-interest region image. If the sum of absolute differences is lower than a predetermined threshold, then the relative position is not recorded.

Then, the processing module 160 performs a binarizing process to the obtained edge boundary. If the pixel value on the edge boundary is larger than a predetermined threshold, then the pixel value is set as the maximum pixel value (such as 255), otherwise the original pixel value is maintained. Since the above method may generate isolated dark spot noises, the processing module 160 performs a median filtering process to the binarized edge boundary to remove dark spot noises and maintain image sharpness and the illumination of the pixels on the peripheral. The process of median filtering is to sort the pixels on the binarized edge boundary and replace the pixel value with the median of the sorted pixels.

After that, the processing module 160 performs a first derivative high-pass filtering to each pixel on the edge boundary with a Sobel filter to obtain the energy magnitude and the gradient direction of the pixels, wherein the first derivative ∇f is expressed as formula (3), the energy magnitude ∇f (x, y) is expressed as formula (4), and the gradient direction α (x, y) is expressed as formula (5).

$$\nabla f = \frac{\partial f}{\partial x} + \frac{\partial f}{\partial y}, G_x = \frac{\partial f}{\partial x}, G_y = \frac{\partial f}{\partial y} \quad (3)$$

-continued $$\nabla f(x, y) = \sqrt{G_x^2 + G_y^2} \quad (4)$$

$$\alpha(x, y) = \tan^{-1}\left(\frac{G_y}{G_x}\right) \quad (5)$$

Furthermore, the processing module 160 quantifies the gradient direction α (x, y) into such as four directions. For example, the gradient direction α (x, y) smaller than 22.5° or larger than 157.5° is quantified as θ (x, y)=0°, the gradient direction α (x, y) ranging from 22.5° to 67.5° is quantified as θ (x, y)=45°, the gradient direction α (x, y) ranging from 67.5° to 112.5° is quantified as θ (x, y)=90°, and the gradient direction α (x, y) ranging from 112.5° to 157.5° is quantified as θ (x, y)=135°.

Figure 8:
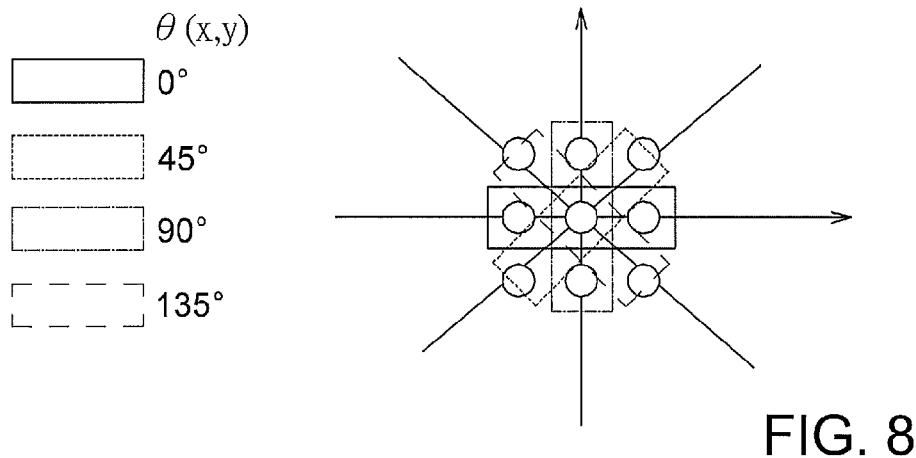
FIG. 8 shows the application of non-maximum suppression to energy magnitude according to the gradient direction according to a preferred embodiment of the invention.

After quantifying the gradient direction, the processing module 160 further performs a regional energy evaluation process to each pixel in a corresponding gradient direction to determine whether to maintain the pixel. The above step mainly applies non-maximum suppression to the energy magnitude according to the gradient direction. That is, a local maximum is located in the same gradient direction to suppress the occurrence of other unreal edge points as indicated in FIG. 8. FIG. 8 shows the application of non-maximum suppression to energy magnitude according to the gradient direction according to a preferred embodiment of the invention. When θ (x, y)=0°, the pixels p (x+1, y), p (x, y) and p (x−1, y) are examined. When θ (x, y)=45°, the pixels p (x+1, y+1), p (x, y) and p (x−1, y−1) are examined. When θ (x, y)=90°, the pixels p (x, y+1), p (x, y) and p (x, y−1) are examined. When θ (x, y)=135°, the pixels p (x+1, y−1), p (x, y) and p (x−1, y+1) are examined.

Figure 9A:
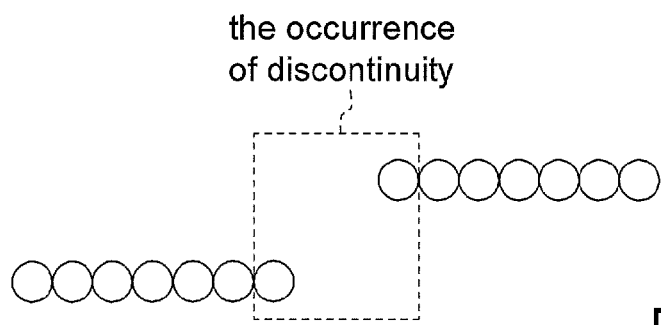
FIG. 9a shows a discontinuous segment of edge points.
Figure 9B:
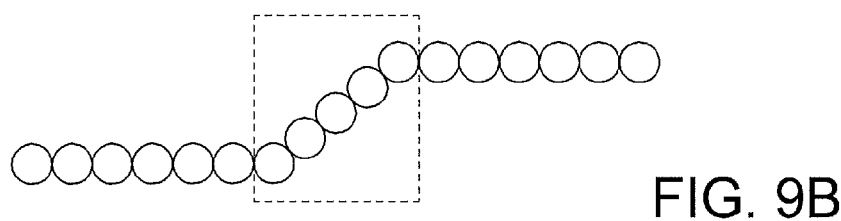
FIG. 9b shows a compensated segment of edge points.

Then, the processing module 160 performs a hysteresis thresholding process to the pixels according to a first threshold $T_h$ and a second threshold $T_l$ to determine whether the maintained pixel are edge points, wherein the first threshold $T_h$ is larger than the second threshold $T_l$. Any pixel whose energy magnitude being larger than the first threshold $T_h$ is determined as an edge point, and its adjacent pixels whose energy magnitude being larger than the second threshold $T_l$ are also determined as edge points. However, discontinuity may still occur to part of the pixels. Thus, with respect to the discontinuous edge points, the processing module 160 estimates the slope between the points from the obtained gradient direction, and, based on the slope, further compensates the discontinuous edge points to establish a complete edge segment. Referring to FIG. 9a and FIG. 9b. FIG. 9a shows a discontinuous segment of edge points. FIG. 9b shows a compensated segment of edge points.

Next, the process proceeds to step S220, the processing module 160 determines whether the touch action is generated according to whether the difference between the current image and a previous image reaches a third threshold and whether an extended region centered at the complete edge segment is touched. If the difference exceeds the third threshold and the extended region is touched, this implies that an object enters the touch region 170, and a touch action is determined. If the touch action is not generated, then the process returns to step S200.

After a touch action is generated, the corresponding image of the touch action of object is represented as a Gaussian distribution in the window-of-interest region image, and the process proceeds to step S230. In step S230, the processing module 160 executes a gravity center estimation computation to determine the pixels corresponding to the touch action. The gravity center $W_p$ is expressed as formula (6), wherein F (i) denotes the pixel value of a current image, and bg (i) denotes the pixel value of a background image.

$$W_p = \sum_{i=bl}^{br} \frac{i * |F(i) - bg(i)| / bg(i)}{|F(i) - bg(i)| / bg(i)} \quad (6)$$

Figure 10:
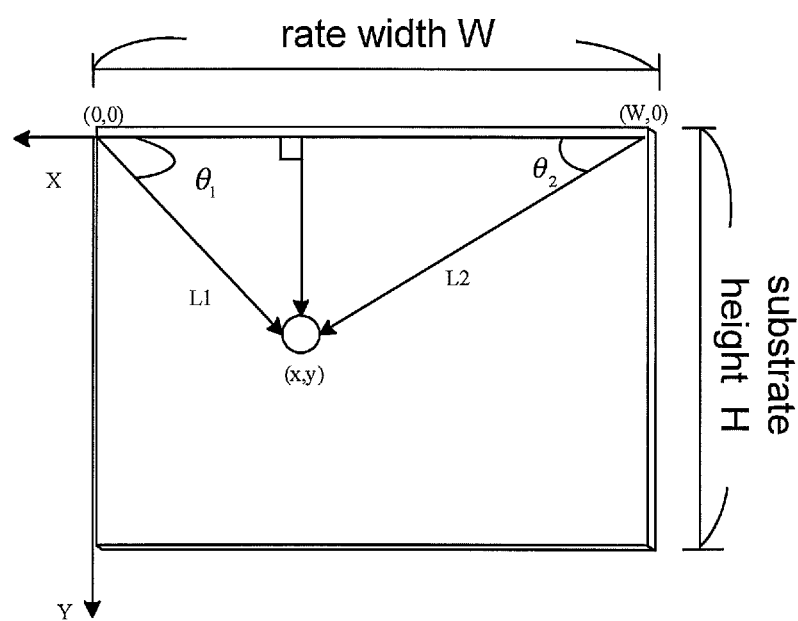
FIG. 10 shows a conversion of coordinates according to a preferred embodiment of the invention.

Then, referring to FIG. 10, a conversion of coordinates according to a preferred embodiment of the invention is shown. In step S240, the processing module 160 obtains the coordinate (x, y) of the touch point P as indicated in formula (7) according to two contained angles $\theta_1$ and $\theta_2$ detected by the two image sensors 152 and 154 based on the glass module 120 with respect to a touch point P of an object in the touch region.

$$x = \frac{\tan\theta_2 \times W}{\tan\theta_1 + \tan\theta_2}, \quad y = \frac{W \times \tan\theta_1 \tan\theta_2}{\tan\theta_1 + \tan\theta_2} \quad (7)$$

The optical touch system and method disclosed in the above embodiments of the invention has many advantages exemplified below:

The optical touch system and the method thereof disclosed in the invention replace conventional reflective bars with reflective clothes, not only increasing the overall average gray values but also resolving the problem of insufficient illumination at the corners. Besides, the invention adopts a simplified structure of glass module to reduce manufacturing complexity and the troubles during assembly, packaging and delivery. Thus, the cost can be further reduced. Also, the invention also uses related algorithm to reduce of likelihood of erroneous action before the object enters the touch region.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. An optical touch system, comprising:
a substrate;
a glass module merely disposed in a non-active region at one side of the substrate;
two light sources respectively disposed at two terminals of the glass module;
three reflective clothes disposed on the edges of the substrate contiguously, wherein a touch region is formed among the three reflective clothes and the glass module and used for reflecting the light emitted from the two light sources;
first and second image sensors disposed respectively next to the two light sources for capturing images in the touch region; and
a processing module for determining whether a touch action is performed according to the images in the touch region;
wherein the first and second image sensors capture first and second initial images respectively from the touch region and further combine the first and second initial images to obtain a background image, and the processing module performs an initial processing on the background image to determine a left boundary and a right boundary of the background image, and the processing module obtains an effective region according to the left boundary and the right boundary on the background image;

wherein the first and second image sensors capture a current image from the touch region, and the processing module, based on the non-zero pixels on the left boundary and the right boundary, defines a window-of-interest region image of the current image and further compares the window-of-interest region image with a golden image to determine whether the glass module is strain offset.

2. The optical touch system according to claim 1, wherein if the glass module is determined as not strain offset, then the processing module performs a low-pass filtering process to the current image to remove high-frequency noises.

3. The optical touch system according to claim 2, wherein the processing module performs matching with an inverted mask to each pixel of the window-of-interest region image within a similarity search range centered at the pixel to position the edge boundaries of a physical surface and a reflective surface of the window-of-interest region image, performs a binarizing process to the obtained edge boundaries, and performs a median filtering process to the binarized edge boundaries to remove dark spot noises.

4. The optical touch system according to claim 3, wherein the processing module performs a high-pass filtering process to each pixel on the edge boundary to obtain the energy magnitude and the gradient direction of the pixels, and performs regional energy evaluation to each pixel in a corresponding gradient direction to determine whether to maintain the pixel.

5. The optical touch system according to claim 4, wherein the processing module performs a hysteresis thresholding process to the maintained pixels according to a first threshold and a second threshold to determine whether the maintained pixels are edge points, and, based on the slope, further compensates the discontinuous edge points to establish a complete edge segment.

6. The optical touch system according to claim 5, wherein the processing module determines whether the touch action is generated according to whether the difference between the current image and a previous image reaches a third threshold and whether an extended region centered at the complete edge segment is touched.

7. The optical touch system according to claim 6, wherein if the touch action is generated, then the processing module executes a gravity center estimation computation to determine the pixel corresponding to the touch action.

8. The optical touch system according to claim 6, wherein if the touch action is generated, then the processing module performs calculation to obtain the coordinate of the touch point according to the two contained angles detected by the two image sensors based on the glass module with respect to a touch point.

9. An optical touch method used in an optical touch system comprising a substrate, a glass module, two light sources, three reflective clothes, first and second image sensors and a processing module, wherein the glass module is merely disposed in a non-active region at one side of the substrate, the two light sources are respectively disposed at two terminals of the glass module, the three reflective clothes are disposed on the edges of the substrate contiguously, a touch region is formed among the three reflective clothes and the glass module, the first and second image sensors are disposed respectively next to the two light sources, and the optical touch method comprises:

capturing first and second initial images from the touch region by the first and second image sensors respectively and combining the first and second initial images to obtain a background image;

performing an initial processing on the background image to determine a left boundary and a right boundary on the background image by the processing module to obtain an effective region;

capturing a current image from the touch region by the first and second image sensors; and defining a window-of-interest region image of the current image and comparing the window-of-interest region image with a golden image by the processing module based on the non-zero pixels on the left boundary and the right boundary to determine whether the glass module is strain offset.

10. The optical touch method according to claim 9, further comprising:

performing a low-pass filtering to the current image by the processing module to remove high-frequency noises if the glass module is determined as not strain offset.

11. The optical touch method according to claim 10, further comprising:

performing a matching process to each pixel of the window-of-interest region image within a similarity search range centered at the pixel to position the edge boundaries of a physical surface and a reflective surface of the window-of-interest region image, a binarizing process to the obtained edge boundaries, and a median filtering process to the binarized edge boundaries to remove dark spot noises by the processing module with an inverted mask.

12. The optical touch method according to claim 11, further comprising:

performing a high-pass filtering to each pixel on the edge boundary to obtain the energy magnitude and the gradient direction of the pixels and a regional energy evaluation process to each pixel in a corresponding gradient direction to determine whether to maintain the pixel by the processing module.

13. The optical touch method according to claim 12, further comprising:

performing a hysteresis thresholding process to the maintained pixels according to a first threshold and a second threshold by the processing module to determine whether the maintained pixels are edge points, and further compensating the discontinuous edge points by the processing module based on the slope to establish a complete edge segment.

14. The optical touch method according to claim 13, further comprising:

determining by the processing module with respect to whether the touch action is generated according to whether the difference between the current image and a previous image reaches a third threshold and whether an extended region centered at the complete edge segment is touched.

15. The optical touch method according to claim 14, further comprising:

executing a gravity center estimation computation by the processing module to determine the pixel corresponding to the touch action if the touch action is generated.

16. The optical touch method according to claim 14, further comprising:

calculating to obtain the coordinate corresponding to the touch point by the processing module according to the two contained angles detected by the two image sensors based on the glass module with respect to a touch point if the touch action is generated.

\* \* \* \* \*